(12) United States Patent
Fang et al.

(10) Patent No.: US 12,060,034 B1
(45) Date of Patent: Aug. 13, 2024

(54) SEAT BELT ASSEMBLIES FOR MITIGATING SPINAL TENSION DURING FREE-FLAIL

(71) Applicant: B/E Aerospace, Inc., Winston-Salem, NC (US)

(72) Inventors: Huiyu Fang, Oak Ridge, NC (US); James R. Penley, Pfafftown, NC (US); Mark B. Dowty, Rural Hall, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 18/105,656

(22) Filed: Feb. 3, 2023

(51) Int. Cl.
| | | |
|---|---|---|
| *B60R 22/30* | (2006.01) | |
| *B60R 22/46* | (2006.01) | |
| *B60R 22/48* | (2006.01) | |

(52) U.S. Cl.
CPC .............. *B60R 22/30* (2013.01); *B60R 22/46* (2013.01); *B60R 2022/4841* (2013.01)

(58) Field of Classification Search
CPC ......... B60N 2/688; B60R 22/00; B60R 22/30; B60R 22/34; B60R 22/195; B60R 22/41; B60R 22/343; B60R 22/36; B60R 22/26; B60R 22/18; B64D 25/02; B64D 25/04
See application file for complete search history.

(56) References Cited

U.S. PATENT DOCUMENTS

| | | | |
|---|---|---|---|
| 4,256,330 A | 3/1981 | Geoffrey | |
| 5,547,143 A * | 8/1996 | Miller, III | ........... B60R 22/3413 242/379.1 |
| 5,823,627 A * | 10/1998 | Viano | ..................... B60N 2/688 297/483 |
| 7,416,042 B2 | 8/2008 | Czaykowska et al. | |
| 7,673,906 B2 | 3/2010 | Bell | |
| 7,703,806 B2 * | 4/2010 | Bell | ....................... B60R 22/024 297/483 |
| 9,561,777 B2 * | 2/2017 | Bell | ........................ B60R 22/20 |
| 10,518,740 B2 | 12/2019 | Ruthinowski et al. | |
| 2008/0122214 A1 * | 5/2008 | Bell | ....................... B60R 22/024 280/801.1 |

(Continued)

FOREIGN PATENT DOCUMENTS

| | | | | |
|---|---|---|---|---|
| CN | 109249891 B | * | 9/2020 | ............. B60R 22/28 |
| DE | 102016103879 A1 | * | 9/2016 | ............ B60R 22/185 |
| WO | WO-2014049217 A1 | * | 4/2014 | ............. B60N 2/366 |

OTHER PUBLICATIONS

U.S. Appl. No. 17/707,689, Mar. 29, 2022, Dowty et al.

*Primary Examiner* — Jason D Shanske
*Assistant Examiner* — Scott Lawrence Strickler
(74) *Attorney, Agent, or Firm* — Suiter Swantz IP

(57) ABSTRACT

Disclosed are embodiments of passenger seats equipped with seat belts for mitigating seat damage and spinal tension from free-flail movements. In embodiments, the assembly includes a seat back, a first slip ring positioned proximate a top of the seat back, a second slip ring positioned lower on the seat back, a retractor, and a webbing threaded through each of the first and second slip rings. During normal use of the seat the first slip ring forms a first pivot for the webbing, and during a qualifying deceleration event the second slip ring forms a new pivot for the webbing lower on the seat back. In a further embodiment, first and second webbings form primary and auxiliary restraints guided by respective first and second pivots.

16 Claims, 6 Drawing Sheets

(56) References Cited

U.S. PATENT DOCUMENTS

| | | | |
|---|---|---|---|
| 2009/0091115 A1* | 4/2009 | Bell | B60R 22/20 280/801.2 |
| 2023/0166843 A1* | 6/2023 | Bentley | B64D 11/0619 297/216.13 |

* cited by examiner

SEAT BELT ASSEMBLIES FOR MITIGATING SPINAL TENSION DURING FREE-FLAIL

TECHNICAL FIELD AND BACKGROUND

The present disclosure relates generally to seat belt assemblies for vehicles such as aircraft, and more particularly, to shoulder belt assemblies configured to mitigate seat damage and spinal tension from free-flail movements that can occur during a sudden deceleration of a vehicle.

Passenger restraints such as seat belts are designed to prevent serious injury during a sudden deceleration of a vehicle. Typical seat belts may be configured as lap belts, shoulder belts, and combinations thereof forming multipoint harnesses. Sophisticated seat belts may include pretensioners and load limiters. In use, pretensioners are configured to retract a seat belt to increase tension when a vehicle decelerates rapidly, while load limiters are configured to pay out a seat belt slightly when the tension exceeds a predetermined threshold. In some instances, the two work together to maintain the passenger generally against the seat while ensuring that the restraining forces acting on the passenger due not rise to a level that would cause injury.

FIGS. 1 and 2 illustrate examples of conventional seat belt assemblies for controlling forward movements in a vehicle such as an aircraft. FIG. 1 illustrates a conventional three-point assembly including a lap belt and a shoulder belt. FIG. 2 illustrates a conventional lap belt. During a sudden deceleration, the shoulder belt shown in FIG. 1 restrains the upper torso whereas the lap belt shown in FIG. 2 does not. As such, the passenger movement shown in FIG. 2 is greater than the passenger movement shown in FIG. 1, which may be referred to as a free-flail condition in which the body folds over about the waist. In aircraft, a passenger seated in a front row, or in a seat without a reachable forward structure for limiting forward movement, may undergo free-flail during a sudden deceleration such as a crash.

It has been determined that free-flail movement subjects the passenger to spinal tension loads that may exceed a dangerous threshold. While shoulder belts may be effective at reducing spinal loading, conventional shoulder belt assemblies and attachments transfer significant loads through the seat structure. In the case of aircraft, an extreme deceleration and conventional shoulder belt attachment may cause significant seat deformation, particularly to the seat back. While increased loads may be mitigated by structurally reinforcing the seat, reinforcement adds weight, complexity, and cost to the seat, which is undesirable in aircraft applications.

Therefore, what is needed is a solution for mitigating spinal tension while simultaneously preserving the structural integrity of the seat, without the disadvantages and limitations associated with conventional, sophisticated shoulder belt assemblies.

BRIEF SUMMARY

To achieve the foregoing and other advantages, in a first aspect the present disclosure provides a passenger seat assembly including a seat including a seat back having a top, a bottom, lateral sides, a front, and a back. The assembly further includes a retractor positioned proximate the bottom of the seat back, a first slip ring affixed to the seat back proximate the top of the seat back, the first slip ring forming a first pivot, a second slip ring affixed to the seat back between the retractor and the first slip ring, the second ring forming a second pivot, and a webbing having a first end wound on the retractor, a second end positioned outside of the retractor, and the webbing threaded through each of the second slip ring and the first slip ring. In use, when a pulling force on the webbing is less than a predetermined threshold force value, the webbing is guided by the first pivot formed by the first slip ring. In use, when a pulling force on the webbing exceeds the predetermined threshold force value, the webbing is guided by the second pivot formed by the second slip ring.

In some embodiments, in use when the pulling force on the webbing exceeds the predetermined threshold force value, the first slip ring is configured to detach from the seat back.

In some embodiments, in use when the pulling force on the webbing exceeds the predetermined threshold force value, the first slip ring is configured to plastically deform to release the webbing.

In some embodiments, the retractor includes a rotating shaft, a lock configured to lock the rotating shaft against rotation, at least one sensor operative to output a signal when a sensed parameter exceeds a predetermined threshold value, and an activation device operative to activate the lock, the activation device communicatively coupled to the at least one sensor and operably coupled to the lock, and wherein upon receiving a signal output by the at least one sensor, the activation device is configured to activate the activation device thereby activating the lock.

In some embodiments, the sensed parameter includes at least one of rotational speed of the rotating shaft, pay out speed of the webbing, rotational acceleration of the rotating shaft, a number of rotations of the rotating shaft, loading on the webbing, loading on attachment structure of the retractor, and accelerations on the seat.

In some embodiments, the lock is a reel lock configured to lock the rotating shaft against rotation, the at least one sensor is operative to output the signal when the sensed parameter of the rotating shaft exceeds the predetermined threshold value, and the activation device is configured to activate the reel lock.

According to another aspect, the present disclosure provides a passenger seat assembly including a seat including a seat back having a top, a bottom, lateral sides, a front, and a back. The assembly further includes a retractor positioned proximate the bottom of the seat back, a slip ring affixed to the seat back proximate the top of the seat back, the slip ring forming a first pivot, a first webbing having a first end wound on the retractor, a second end positioned outside of the retractor, and the first webbing threaded through the slip ring, and a second webbing having a first end affixed proximate a bottom of the seat back and a second end affixed to the slip ring. In use, when a pulling force on the first webbing is less than a predetermined threshold force value, a primary restraint formed by the first webbing is guided by the first pivot. In use, when a pulling force on the first webbing exceeds the predetermined threshold force value, an auxiliary restraint formed by the second webbing and a portion of the first webbing is guided by a second pivot associated with the second webbing.

In some embodiments, the first webbing includes a first portion, a second portion, and a coupler configured to releasably couple the first portion to the second portion, the first portion extends from the retractor to the coupler, the second portion extends from the coupler to the second end of the first webbing, and the coupler is positioned between the retractor and the slip ring. In use, when the pulling force on the first webbing exceeds the predetermined threshold force value, the coupler is configured to engage the slip ring and decouple the first portion of the first webbing from the second portion of the first webbing.

In some embodiments, in use when the pulling force exceeds the predetermined threshold force value, the coupler is configured to cause the slip ring to detach from the seat back.

In some embodiments, in use when the pulling force exceeds the predetermined threshold force value, the coupler is configured to cause the slip ring to undergo plastic deformation thereby releasing the first webbing.

In some embodiments, the slip ring is positioned proximate the top of the seat back, the second webbing is not attached to the first webbing, and the second pivot is positioned lower on the seat back as compared to the first pivot.

In some embodiments, the coupler is dimensioned larger than a guide opening formed through the slip ring such that the coupler is incapable of being pulled through the guide opening.

In some embodiments, when the predetermined threshold force value is exceeded, the coupler is configured to lockingly engage the slip ring.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Broadly, the present disclosure provides passenger seat assemblies including restraints configured to control forward movement during a sudden deceleration event such as a crash. Applications for the passenger seat assemblies described herein include, but are not limited to, aircraft and particularly front row passenger seats, exit row passenger seats, and other passenger seats without any forward structure reachable to limit forward movement. Benefits of the embodiments described herein include, but are not limited to, reducing spinal loads on the passenger, preserving the structural integrity of the passenger seat, and a reduction in the required structural reinforcement of the seat associated with the passenger restraints.

Figure 3:
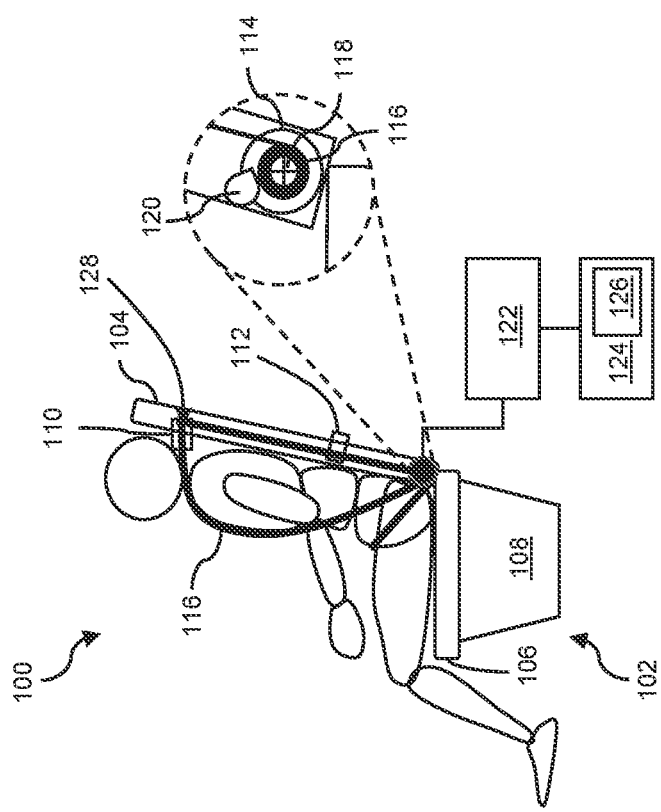
FIG. 3 is a schematic diagram showing a passenger seat assembly according to the present disclosure, during normal use prior to any sudden deceleration.

FIG. 3 shows a passenger seat assembly 100 according to a first embodiment of the present disclosure. The assembly 100 includes a passenger seat 102 including a seat back 104. The passenger seat 102 may further include a seat bottom 106 and a frame or seat base 108 supporting each of the seat back 104 and the seat bottom 106 in a mounted condition to the aircraft deck. In some embodiments, the seat back 104 may be fixed in an upright sitting position. In other embodiments, the seat back 104 may be adjustable between an upright sitting position and a reclined sitting position. In some embodiments, the seat back 104 may be coupled to the seat bottom 106. The seat back 104 may have any shape, however, generally includes a top, a bottom, opposing lateral sides, a front, and a back.

The assembly further includes a first slip ring 110 affixed to the seat back 104 proximate the top of the seat back, and a second slip ring 112 affixed to the seat back 104 spaced apart from the first slip ring 110 in a direction of the bottom of the seat back 104. As shown, the second slip ring 112 is positioned lower on the seat back 104 as compared to the first slip ring 110, and in some instances about mid-span between the top and bottom or nearer to the bottom than to the top of the seat back. The first slip ring 110, also referred to herein as the "upper" slip ring, may be positioned closer to one lateral side as compared to the other such that the webbing may be pulled diagonally across the chest of the wearer. The second slip ring, also referred to herein as the "lower" slip ring, may be positioned closer to one lateral side, along one lateral side, positioned proximate the back of the seat back under the dress cover, positioned internal to the seat back 104, or elsewhere. In some embodiments, the first slip ring 110 is positioned outside of the seat back 104 and the second slip ring 112 is positioned inside the seat back, thus the second slip ring 112 may be concealed from view during normal use of the seat.

During normal use of the seat corresponding to low G-force events and loading less than a predetermined threshold force value as described herein, the first slip ring 110 forms a first pivot, or "upper" pivot, about which the webbing changes direction as discussed further below. During emergency use of the seat corresponding to high G-force events (e.g., 16G or greater) and loading exceeding the predetermined threshold force value, the first slip ring 110 is configured to detach, breakaway, or otherwise separate from the seat back 104, or alternatively undergo plastic deformation to release the captured webbing, thereby eliminating the first pivot and allowing the second slip ring 112 to form a new pivot, or "lower" pivot, about which the webbing also changes direction, but at a lower position along the height of the seat back 104 thereby reducing the bending moment on the constrained seat back. During normal use of the seat, the second slip ring 112 does not function as a pivot, however, may cause a slight directional change in the webbing due to the webbing being threaded through the second slip ring 112.

A retractor 114 anchored proximate the bottom of the seat back 104 is configured to pay in and pay out the webbing. The retractor 114 may be affixed to the seat back, other seat structure, or to structure positioned alongside the seat. The webbing 116 includes a first end being wound on the retractor 114, and a second end positioned outside of the retractor 114. The second end, for example, may terminate in a buckle or connection to another webbing such as a lap belt. The webbing 116 is threaded through each of the first slip ring 110 and the second slip ring 112.

In some embodiments, the retractor 114 may be implemented as a reel including a rotating shaft 118 about which the webbing 116 is wound, and a reel lock 120 configured to lock the rotating shaft against rotation upon the occurrence of a sudden deceleration. For example, the reel lock 120 in one embodiment may include a pawl configured to engage a toothed gear affixed to the shaft. In some embodiments, the reel lock 120 may act directly on the webbing 116 to prevent further unwinding or pay out from the reel.

In some embodiments, the retractor 114 may be communicatively coupled to at least one sensor 122 operative to output a signal when a sensed parameter of the rotating shaft 118 exceeds a predetermined magnitude threshold. For example, the sensed parameter may include at least one of rotational speed of the rotating shaft, rotational acceleration of the rotating shaft, and number of rotations of the rotating shaft, associated with an unwinding direction of the seat belt. In some embodiments, the at least sensor 122 may be an acceleration sensor associated with the seat or other structure. An activation device 124 may be provided operative to activate the reel lock 120 to lock the rotating shaft 118 against rotation to prevent further unwinding or pay out of the webbing 116. The activation device 124 may or may not include a time delay device 126 electrically coupled to the at least one sensor 122 and in some embodiments an element of the activation device 124, is operative to, upon receiving the signal output by the at least one sensor 122, activate the activation device 124 upon completion of a time delay after receiving the signal output by the at least one sensor 122.

In some embodiments, the at least one sensor 122 is configured to detect changes in velocity of structures to which the sensors are connected or coupled, such as the components of at least one of the retractor 114, the webbing 116, the seat 102, or other structures in an aircraft passenger cabin or other structures of the aircraft overall such as fuselage and frame elements. The at least one sensor 122 may be configured to detect movements corresponding to high G-force events and may include any combination of multi-axis accelerometers, gyroscopes, and magnetometers, among others. In some implementations, accelerometers may be configured to measure an amount of acceleration in a particular direction, gyroscopes may be configured to measure changes in orientation or relative velocity, and magnetometers measure changes in magnetic fields that can be used to determine absolute orientation of the elements to which the magnetometers are connected. Because accelerometers, gyroscopes, and magnetometers may be used to measure different features of inertial movement, the sensor outputs may be combined into or may otherwise contribute to connectivity.

In some embodiments, the at least one sensor 122 may be a ball and spring type acceleration switch that is generally maintained in a non-conducting condition in which a spring biases a ball from a conducting position. Such switches achieve electrically conducting conditions when actuated by acceleration greater than a predetermined magnitude threshold and return to non-conducting condition when the acceleration reduces below the threshold. The magnitude threshold of each such sensor can be predetermined, for example, by the spring constant of the spring and by the geometry of the device. In such a device, the ball, serving as an inertial mass, moves against the force of the spring to a conducting position to provide connectivity by either direct conduction through the ball or by otherwise engaging or actuating a switch with the ball during an inertial event. Thus, the magnitude threshold can be predetermined by selection of the acceleration sensors used or by adjustment of an acceleration sensors.

With continued reference to FIG. 3, the passenger seat assembly 100 is shown during normal use of the seat wherein the retractor 114 operates to pay in and out the webbing 116 and the first slip ring 110 guides the webbing 116 therethrough and causes the directional change of the webbing 116 about the upper pivot 128 formed by the first slip ring 110.

Figure 2:
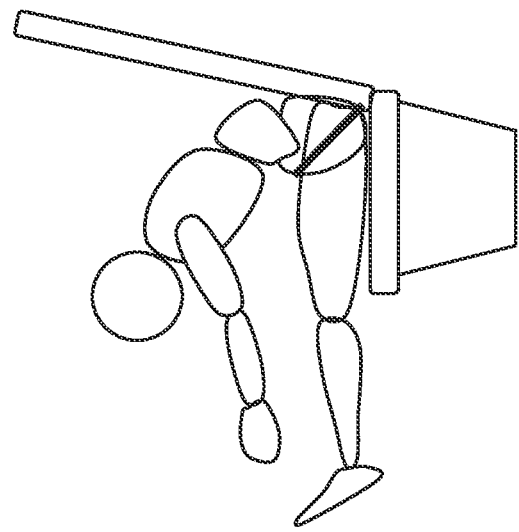
FIG. 2 is a schematic diagram showing use of a conventional lap belt for restraining passenger motion during a sudden deceleration and the resulting free-flail body movement.
Figure 1:
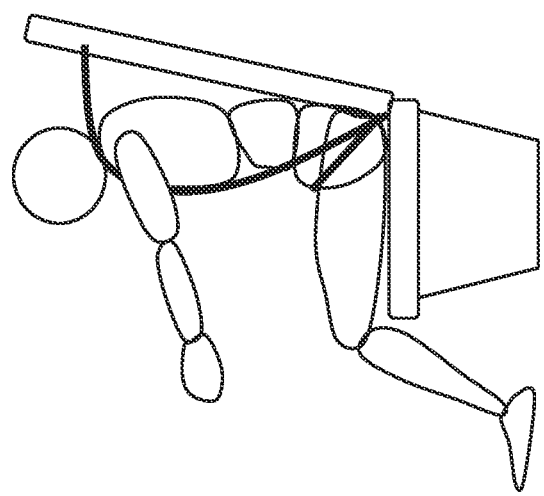
FIG. 1 is a schematic diagram showing use of a conventional shoulder belt for restraining passenger motion during a sudden deceleration.
Figure 4:
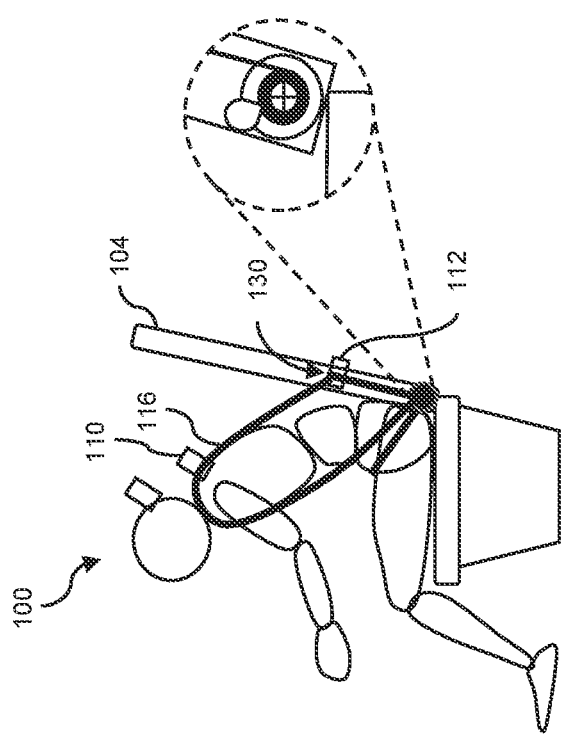
FIG. 4 is a schematic diagram showing the passenger seat assembly of FIG. 3 in use during a sudden deceleration.

FIG. 4 shows the passenger seat assembly 100 during a sudden deceleration, for instance an emergency situation, wherein the retractor 114 may be placed in a locked condition, the first slip ring 110 has detached from the seat back 104 or otherwise released the webbing, and the second slip ring 112, which remains affixed to the seat back 104, now guides the webbing 116 therethrough and causes the directional change of the webbing 116 about the lower pivot 130. In use, during a sudden deceleration of sufficient magnitude, the lower slip ring 112 guides the webbing 116 about the second pivot 130 at a lower area of the seat back 104 as compared to the upper pivot. The actual position of the lower slip ring 112 may depend on the seat design, for instance the position of structural elements configured to anchor the second slip ring 112 thereto to transfer loads to the seat. The second slip ring 112 serves as the new pivot when the first slip ring 110 separates from the seat back or plastically deforms thereby releasing the webbing 116. The pulling force on the webbing 116 sufficient to cause the first slip ring 110 to separate or release, referred to herein as the predetermined threshold force value, may be for example about 250 lbs. Known to those skilled in the art, seat belt assemblies are typically configured to survive abuse loads up to about 200 lbs. As such, the predetermined threshold load value may vary but is greater than the maximum abuse load value required of the assembly. Comparing FIGS. 2 and 4 shows how the assembly 100 functions to prevent free-flail thereby mitigating spinal tension. Comparing FIGS. 3 and 4 shows the movement of the upper torso.

Figure 5:
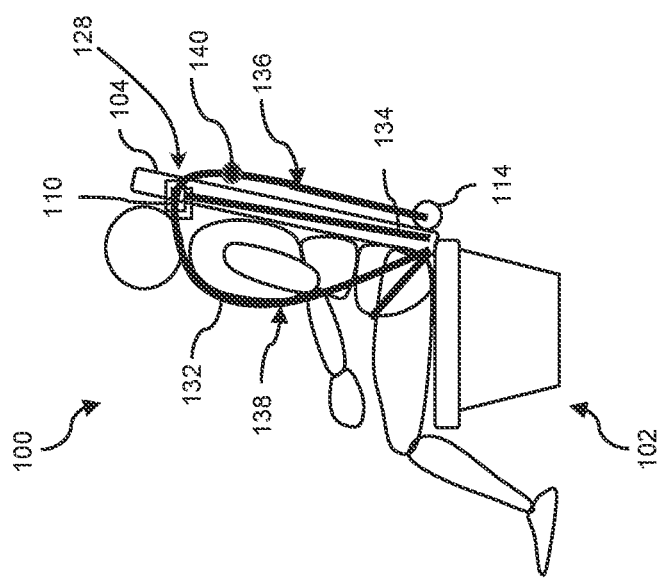
FIG. 5 is a schematic diagram showing a passenger seat assembly according to a further embodiment of the present disclosure, during normal use prior to any sudden deceleration.

FIG. 5 shows a passenger seat assembly 100 according to a further embodiment of the present disclosure. The assembly 100 also includes a passenger seat 102 including a seat back 104. In some embodiments, the seat back 104 may be fixed in an upright sitting position. In other embodiments, the seat back 104 may be adjustable between an upright sitting position and a reclined sitting position. In some embodiments, the seat back 104 may be coupled to the seat bottom 106. The seat back 104 may have any shape, however, generally also includes a top, a bottom, opposing lateral sides, a front, and a back.

The assembly 100 also includes an upper slip ring 110 affixed to the seat back 104 proximate the top of the seat back, which may be positioned closer to one lateral side of the seat back 104 as compared to the other such that the webbing may be pulled diagonally across the chest. During normal use of the seat corresponding to low G-force events and loading less than a predetermined threshold force value, the slip ring 110 forms a first or upper pivot 128 about which the webbing changes direction and the webbing travels through the slip ring 110 unimpeded. During a sudden deceleration, such as an emergency situation of the seat corresponding to high G-force events (e.g., 16G or greater) and loading exceeding the predetermined threshold value, the slip ring 110 is also configured to detach, breakaway, or otherwise separate from the seat back 104 thereby eliminating the first pivot and allowing the webbing to pivot about a new, second or lower pivot about which the webbing changes direction, but at a lower position along the height of the seat back 104 thereby reducing the bending moment on the constrained seat back.

The second embodiment differs from the first embodiment described above in terms of the webbing configuration. In the second or further embodiment, the webbing includes a first webbing 132, also referred to herein as the "primary" webbing, having a first end wound on the retractor 114, a second end positioned outside of the retractor 114, and the first webbing threaded through the slip ring 110. The webbing further includes a second, separate webbing 134, also referred to herein as the "secondary" webbing, having a first end anchored proximate a bottom of the seat back 104, and a second end affixed to the slip ring 110. In this configuration, the second webbing 134 does not interact with the retractor 114.

In use, when the pulling force on the first webbing exceeds the predetermined threshold force value (e.g., about 250 lbs.), the slip ring 110 is configured to detach from the seat back 104 thereby forming a new or second pivot associated with the second webbing 134. The first webbing 132 includes separate first and second portions 136, 138 releasably attached via a coupler 140. As shown, the first portion 136 extends from the retractor 114, such as the retractor described above, to the coupler 140, and the second portion extends from the coupler 140 to the second end of the first webbing 132.

Figure 6:
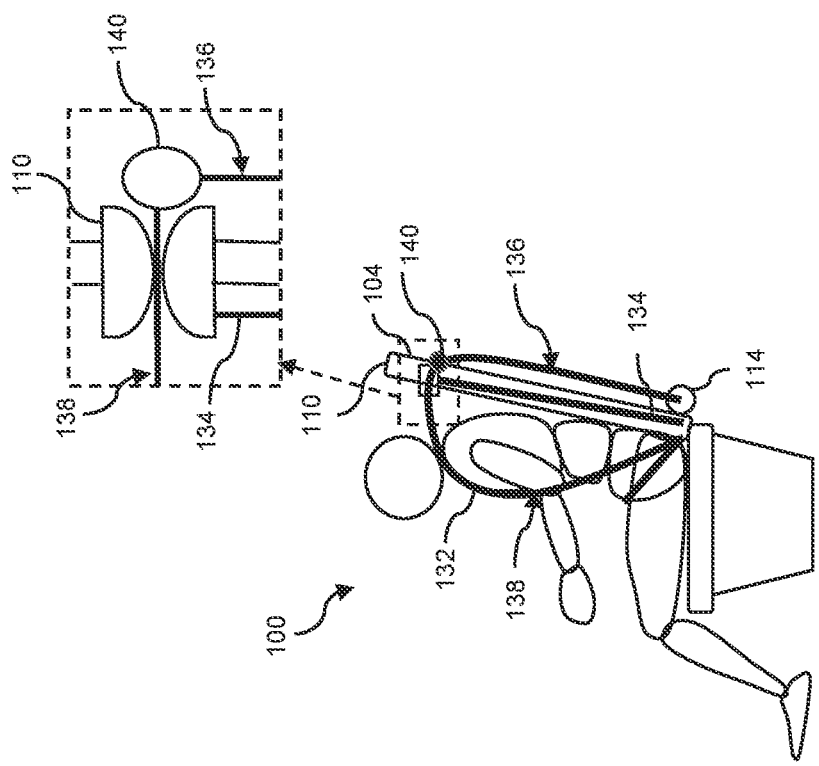
FIG. 6 is a schematic diagram showing the passenger seat assembly of FIG. 5 at the moment of first occurrence of a sudden deceleration.
Figure 7:
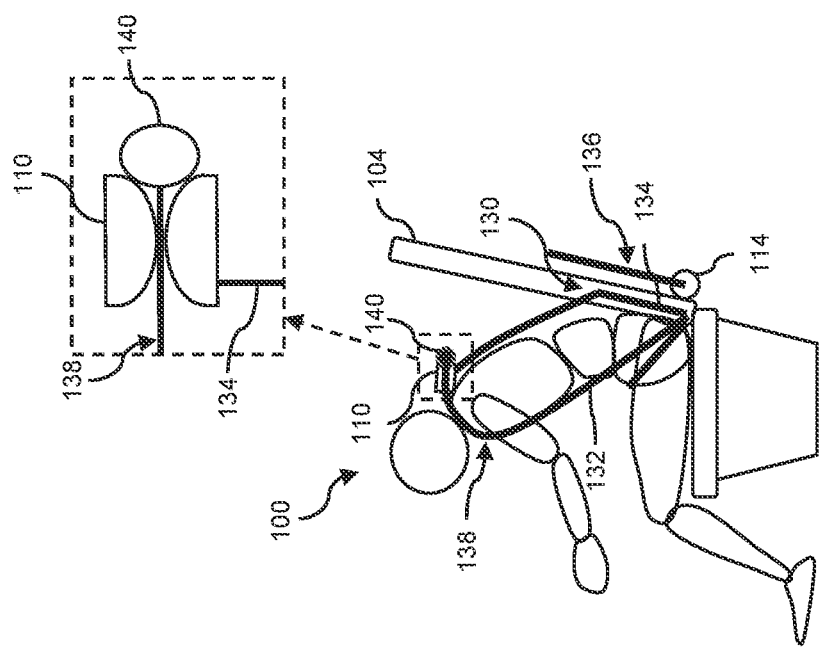
FIG. 7 is a schematic diagram showing the passenger seat assembly of FIGS. 5 and 6 as the sudden deceleration continues.

Referring to FIGS. 6 and 7, when the pulling force on the first webbing 132 exceeds the predetermined threshold value, the coupler 140 is configured to engage the slip ring 110 (see FIG. 6) to thereby cause the slip ring 110 to separate or otherwise detach from the seat back 104, and also the first portion 136 of the first webbing 132 to detach from the coupler 140 as the pulling force on the first webbing 132 continues (see FIG. 7).

FIG. 6 shows the passenger seat assembly 100 during a first stage of the emergency use condition wherein the coupler 140 travels to engage the slip ring 110, for instance locking engagement. The coupler 140 is dimensioned larger than the guide opening through the slip ring 110 such that the coupler 140 is incapable of being pulled through the guide opening. As the pulling force continues, the force of the coupler 140 against the slip ring 110 causes the slip ring 110 to detach, break, or otherwise separate from the seat back 104.

FIG. 7 shows the passenger seat assembly 100 as the forward travel of the passenger and pulling force on the first webbing 132 continues. As the coupler 140 interacts with the slip ring 110 to cause the detachment, the continued pulling force causes the coupler 140 to detach from or otherwise release the first portion 136 of the first webbing 132. The attachment of the slip ring 110 to the second webbing 134 causes the second webbing 134 to join the movement of the second portion 138 of the first webbing 132. The second webbing 134 forms a new pivot, and in some embodiments the new pivot may be formed via a second slip ring, to allow the directional change of the second webbing 134 about the lower pivot, such as the pivot 130 shown in FIG. 7. The position of the new pivot may depend on the seat design, attachment of the second webbing 134, etc.

The force required to decouple the first portion 136 of the first webbing 132 from the coupler 140 is equal or greater than the force required to detach the slip ring 110 from the seat back 104. This ensures that the forward travel of the passenger is controlled to the point at which the coupler 140 is able to interact with the slip ring 110 to cause the detachment.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A passenger seat assembly, comprising:
    a seat including a seat back having a top, a bottom, lateral sides, a front, and a back;
    a retractor positioned proximate the bottom of the seat back;
    a first slip ring affixed to the seat back proximate the top of the seat back, the first slip ring forming a first pivot;
    a second slip ring affixed to the seat back between the retractor and the first slip ring, the second ring forming a second pivot; and
    a webbing having a first end wound on the retractor, a second end positioned outside of the retractor, and the webbing threaded through each of the second slip ring and the first slip ring;
    wherein:
    in use, when a pulling force on the webbing is less than a predetermined threshold force value, the webbing is guided by the first pivot formed by the first slip ring; and
    in use, when a pulling force on the webbing exceeds the predetermined threshold force value, the first slip ring is configured to detach from the seat back such that the webbing is guided by the second pivot formed by the second slip ring.

2. The passenger seat assembly according to claim 1, wherein the retractor comprises:
    a rotating shaft;
    a lock configured to lock the rotating shaft against rotation;
    at least one sensor operative to output a signal when a sensed parameter exceeds a predetermined threshold value; and
    an activation device operative to activate the lock, the activation device communicatively coupled to the at least one sensor and operably coupled to the lock, and wherein upon receiving a signal output by the at least one sensor, the activation device is configured to activate the activation device thereby activating the lock.

3. The passenger seat assembly according to claim 2, wherein the sensed parameter includes at least one of rotational speed of the rotating shaft, pay out speed of the webbing, rotational acceleration of the rotating shaft, a number of rotations of the rotating shaft, loading on the webbing, loading on attachment structure of the retractor, and accelerations on the seat.

4. The passenger seat assembly according to claim 3, wherein:
the lock is a reel lock configured to lock the rotating shaft against rotation;
the at least one sensor is operative to output the signal when the sensed parameter of the rotating shaft exceeds the predetermined threshold value; and
the activation device is configured to activate the reel lock.

5. A passenger seat assembly, comprising:
a seat including a seat back having a top, a bottom, lateral sides, a front, and a back;
a retractor positioned proximate the bottom of the seat back;
a slip ring affixed to the seat back proximate the top of the seat back, the slip ring forming a first pivot;
a first webbing having a first end wound on the retractor, a second end positioned outside of the retractor, and the first webbing threaded through the slip ring; and
a second webbing having a first end affixed proximate a bottom of the seat back and a second end affixed to the slip ring;
wherein:
in use, when a pulling force on the first webbing is less than a predetermined threshold force value, a primary restraint formed by the first webbing is guided by the first pivot;
in use, when a pulling force on the first webbing exceeds the predetermined threshold force value, an auxiliary restraint formed by the second webbing and a portion of the first webbing is guided by a second pivot associated with the second webbing;
the first webbing includes a first portion, a second portion, and a coupler configured to releasably couple the first portion to the second portion;
the first portion extends from the retractor to the coupler;
the second portion extends from the coupler to the second end of the first webbing;
the coupler is positioned between the retractor and the slip ring; and
in use, when the pulling force on the first webbing exceeds the predetermined threshold force value, the coupler is configured to engage the slip ring and decouple the first portion of the first webbing from the second portion of the first webbing.

6. The passenger seat assembly according to claim 5, wherein in use, when the pulling force exceeds the predetermined threshold force value, the coupler is configured to cause the slip ring to detach from the seat back.

7. The passenger seat assembly according to claim 5, wherein in use, when the pulling force exceeds the predetermined threshold force value, the coupler is configured to cause the slip ring to undergo plastic deformation thereby releasing the first webbing.

8. The passenger seat assembly according to claim 5, wherein:
the slip ring is positioned proximate the top of the seat back;
the second webbing is not attached to the first webbing; and
the second pivot is positioned lower on the seat back as compared to the first pivot.

9. The passenger seat assembly according to claim 5, wherein:
the coupler is larger than a guide opening formed through the slip ring such that the coupler is incapable of being pulled through the guide opening; and
when the predetermined threshold force value is exceeded, the coupler is configured to lockingly engage the slip ring.

10. The passenger seat assembly according to claim 5, wherein the retractor comprises:
a rotating shaft;
a lock configured to lock the rotating shaft against rotation;
at least one sensor operative to output a signal when a sensed parameter exceeds a predetermined threshold value; and
an activation device operative to activate the lock, the activation device communicatively coupled to the at least one sensor and operably coupled to the lock, and wherein upon receiving a signal output by the at least one sensor, the activation device is configured to activate the activation device thereby activating the lock.

11. The passenger seat assembly according to claim 10, wherein the sensed parameter includes at least one of rotational speed of the rotating shaft, pay out speed of the webbing, rotational acceleration of the rotating shaft, a number of rotations of the rotating shaft, loading on the webbing, loading on attachment structure of the retractor, and accelerations on the seat.

12. The passenger seat assembly according to claim 10, wherein:
the lock is a reel lock configured to lock the rotating shaft against rotation;
the at least one sensor is operative to output the signal when the sensed parameter of the rotating shaft exceeds the predetermined threshold value; and
the activation device is configured to activate the reel lock.

13. A passenger seat assembly, comprising:
a seat including a seat back having a top, a bottom, lateral sides, a front, and a back;
a retractor positioned proximate the bottom of the seat back;
a first slip ring affixed to the seat back proximate the top of the seat back, the first slip ring forming a first pivot;
a second slip ring affixed to the seat back between the retractor and the first slip ring, the second ring forming a second pivot; and
a webbing having a first end wound on the retractor, a second end positioned outside of the retractor, and the webbing threaded through each of the second slip ring and the first slip ring;
wherein:
in use, when a pulling force on the webbing is less than a predetermined threshold force value, the webbing is guided by the first pivot formed by the first slip ring; and
in use, when a pulling force on the webbing exceeds the predetermined threshold force value, the first slip ring is configured to plastically deform to release the webbing such that the webbing is guided by the second pivot formed by the second slip ring.

14. The passenger seat assembly according to claim 13, wherein the retractor comprises:
a rotating shaft;
a lock configured to lock the rotating shaft against rotation;

at least one sensor operative to output a signal when a sensed parameter exceeds a predetermined threshold value; and an activation device operative to activate the lock, the activation device communicatively coupled to the at least one sensor and operably coupled to the lock, and wherein upon receiving a signal output by the at least one sensor, the activation device is configured to activate the activation device thereby activating the lock.

15. The passenger seat assembly according to claim 14, wherein the sensed parameter includes at least one of rotational speed of the rotating shaft, pay out speed of the webbing, rotational acceleration of the rotating shaft, a number of rotations of the rotating shaft, loading on the webbing, loading on attachment structure of the retractor, and accelerations on the seat.

16. The passenger seat assembly according to claim 15, wherein:

the lock is a reel lock configured to lock the rotating shaft against rotation;

the at least one sensor is operative to output the signal when the sensed parameter of the rotating shaft exceeds the predetermined threshold value; and the activation device is configured to activate the reel lock.

* * * * *